UNITED STATES PATENT OFFICE.

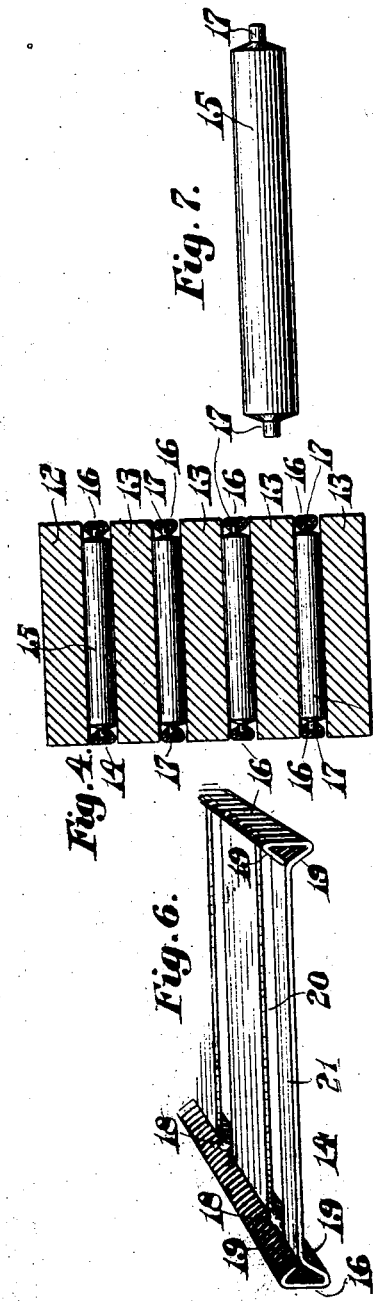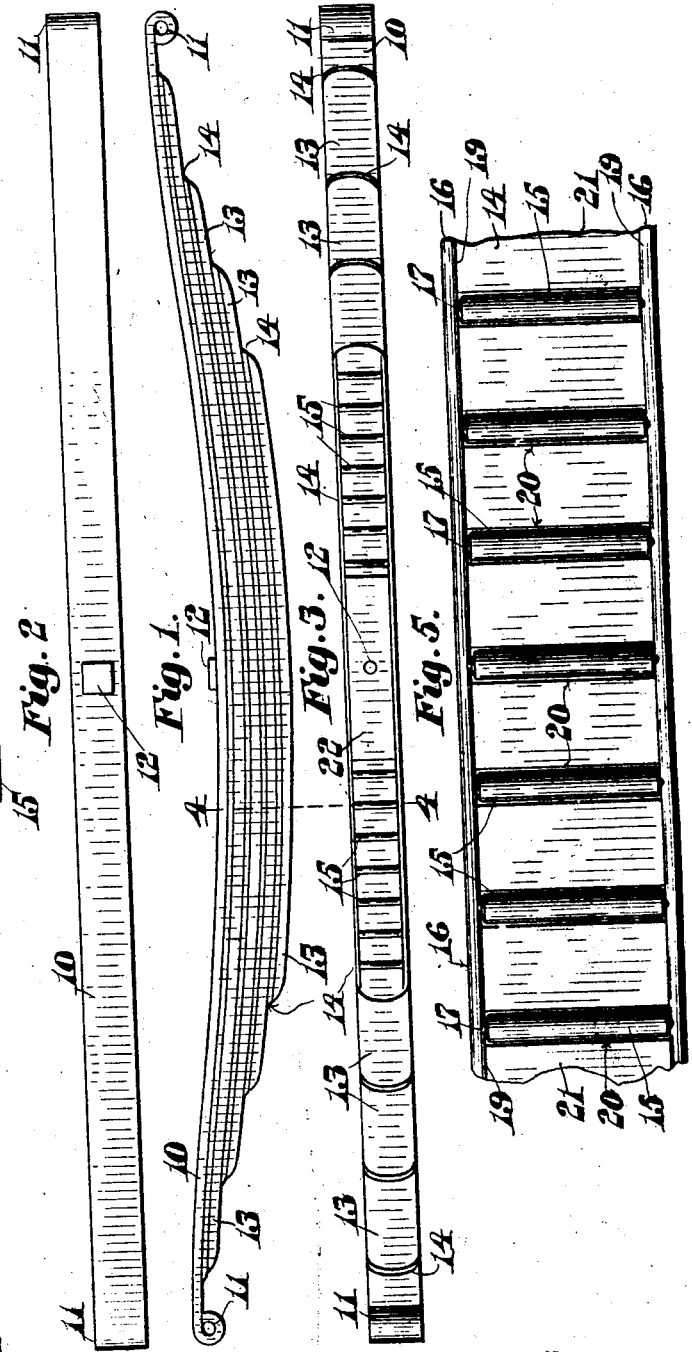

FREDERICK J. MERCER, OF HYDE PARK, MASSACHUSETTS.

SPRING.

No. 814,387.

Specification of Letters Patent.

Patented March 6, 1906.

Application filed September 20, 1905. Serial No. 279,241.

*To all whom it may concern:*

Be it known that I, FREDERICK J. MERCER, a citizen of the United States of America, and a resident of Hyde Park, in the county of Norfolk and State of Massachusetts, (whose post-office address is 54 Gordon avenue, in said city,) have invented certain new and useful Improvements in Springs, of which the following is a specification.

This invention relates to carriage or wagon springs formed of a series of overlaid elastic plates which are clamped or otherwise secured together midway of their length and are adapted to move lengthwise of each other when moved from their normal position.

The object of the present invention is to reduce to a minimum the friction between the various plates when sliding one upon the other, this friction being considerable when great weight is brought to bear upon said springs. The greater part of this friction is overcome by the present invention, which consists in providing a cage with antifriction members, which is interposed between the successive plates of the spring.

The invention further consists of certain novel features of construction and arrangements of parts, which will be readily understood by reference to the description of the drawings and to the claims to be hereinafter given.

Of the drawings, Figure 1 represents an elevation of a spring embodying the features of this invention. Fig. 2 represents a plan of same. Fig. 3 represents an inverted plan of same with the under plate removed. Fig. 4 represents a section on line 4 4 on Figs. 1 and 3, drawn to a greatly-enlarged scale. Fig. 5 represents a plan of a section of the roller-cage. Fig. 6 represents a perspective view of a section of the roller-cage with the rollers removed, and Fig. 7 represents an elevation of a roller.

In the drawings, 10 is the main plate of the spring provided at either end with a loop 11 for securing the same to the supported members. The plate 10 has secured thereto midway of its length by the bolt 12 a plurality of shorter plates 13. Interposed between the plates 10 and 13 are cages 14, each provided with a plurality of rollers 15 or other suitable antifriction members. The rollers 15 are greater in diameter than the width of the sides 16 of the cage 14, so that the plates 10 13 bear wholly upon the rollers 15 and do not contact with the cage 14. By this means there is comparatively no friction between the various plates 10 13, and when pressure is brought to bear thereon to cause them to move lengthwise of one another the plates bear upon the rollers 15, which are free to move about their axes. These rollers 15 are provided with trunnions 17, having bearings 18 in the inner walls 19 of the sides 16 of the cage 14, said cage 14 being provided with an opening 20 through its web 21, in which each roller is adapted to move.

One of the inner inclined walls 19 is adapted to yield for the insertion of the trunnion 17 and to spring back into its normal position after insertion to form a bearing therefor and prevent accidental displacement of said rollers.

A filling-piece 22 is inserted between the inner walls 19 midway of the length of said cages 14 to provide a suitable bearing-surface for the same around the bolt 12.

It is believed that the advantages of such construction of spring are so apparent and the operation so obvious as to need no further description.

Having thus described my invention, I claim—

1. A spring comprising a plurality of overlaid plates, and a cage interposed between two of said plates and provided with antifriction members.

2. A spring comprising a plurality of overlaid plates, and a cage interposed between two of said plates and provided with a plurality of transverse rollers.

3. A spring comprising a plurality of overlaid plates, and a cage interposed between two of said plates and provided throughout its length with transverse rollers.

4. A spring comprising a series of overlaid plates in combination with a plurality of transverse rollers interposed between said plates, and a cage for holding said rollers having sides of a width somewhat less than the diameter of the said rollers.

5. A spring comprising a series of overlaid plates in combination with a plurality of transverse rollers interposed between said plates, and having trunnions at either end, and a cage for holding said rollers, having inner spring side walls adapted to yield to permit the insertion of said rollers, and then retain them in position.

Signed by me at Boston, Massachusetts, this 18th day of September, 1905.

FREDERICK J. MERCER.

Witnesses:
WALTER E. LOMBARD,
EDNA C. CLEVELAND.